United States Patent
Steiner et al.

(10) Patent No.: US 9,558,361 B2
(45) Date of Patent: Jan. 31, 2017

(54) FLEXIBLE ROLE BASED AUTHORIZATION MODEL

(71) Applicant: LexisNexis, Miamisburg, OH (US)

(72) Inventors: Don Paul Steiner, Centerville, OH (US); Bruce Daniel Maxfield, Liberty Township, OH (US); William Donald Kilgallon, Lebanon, OH (US)

(73) Assignee: LEXISNEXIS, A DIVISION OF REED ELSEVIER INC., Miamisburg, OH (US)

( * ) Notice: Subject to any disclaimer, the term of this patent is extended or adjusted under 35 U.S.C. 154(b) by 0 days.

(21) Appl. No.: 15/176,425

(22) Filed: Jun. 8, 2016

(65) Prior Publication Data

US 2016/0283726 A1 Sep. 29, 2016

Related U.S. Application Data

(63) Continuation of application No. 14/041,203, filed on Sep. 30, 2013, now Pat. No. 9,390,276.

(51) Int. Cl.
- *G06F 7/04* (2006.01)
- *G06F 17/30* (2006.01)
- *G06F 21/60* (2013.01)
- *G06F 21/31* (2013.01)

(52) U.S. Cl.
CPC ............ *G06F 21/604* (2013.01); *G06F 21/31* (2013.01); *G06F 2221/2141* (2013.01)

(58) Field of Classification Search
CPC ... H04L 67/303; H04L 67/306; H04L 41/0893
See application file for complete search history.

(56) References Cited

U.S. PATENT DOCUMENTS

| | | | |
|---|---|---|---|
| 6,650,747 B1 | 11/2003 | Bala | |
| 7,676,672 B2 | 3/2010 | Phillips | |
| 2002/0091798 A1* | 7/2002 | Joshi | G06F 17/30867 709/219 |
| 2002/0111842 A1 | 8/2002 | Miles | |
| 2007/0038505 A1 | 2/2007 | Barnes, IV | |
| 2008/0022370 A1* | 1/2008 | Beedubail | G06F 21/6218 726/4 |
| 2008/0289010 A1 | 11/2008 | Frieden et al. | |
| 2008/0313716 A1 | 12/2008 | Park | |
| 2009/0138547 A1* | 5/2009 | Boudreau | H04W 4/08 709/203 |
| 2010/0050252 A1 | 2/2010 | King et al. | |
| 2010/0299738 A1 | 11/2010 | Wahl | |
| 2011/0239275 A1* | 9/2011 | De Peuter | H04L 63/08 726/4 |
| 2011/0314520 A1 | 12/2011 | Olszewski | |

OTHER PUBLICATIONS

International Search Report and Written Opinion for PCT/US2014/058164, mailed Dec. 24, 2014.

(Continued)

*Primary Examiner* — Tae Kim

(74) *Attorney, Agent, or Firm* — Dinsmore & Shohl LLP

(57) ABSTRACT

Systems and methods described herein relate to role-based authorization systems which allow customization of role templates as well as the ability, using roles, for one user to act on behalf of another user.

20 Claims, 3 Drawing Sheets

(56) References Cited

OTHER PUBLICATIONS

Wikipedia, Role-based access control, http://en.wikipedia.org/wiki/Role-based_access_control, retrieved Jul. 1, 2013.
IBM, Resource Access Control Facility, http://www-03.ibm.com/systems/z/os/zos/features/racf/, retrieved Jul. 1, 2013.
Anthony Steven, Applying the Principle of Least Privilege to User Accounts on Windows XP, http://technet.microsoft.com/en-us/library/bb456992.aspx, retrieved Aug. 20, 2013.
Fred B. Schneider, Least Privilege and More, Cornell University, Ithaca, New York, http://www.cs.cornell.edu/fbs/publications/leastPrivNeedham.pdf.
Jeff Langford, Implementing Least Privilege at your Enterprise, SANS Institute InfoSec Reading Room, GIAC Security Essentials Certification (GSEC), Option 1 Version 1.4b, Jul. 5, 2003, http://www.sans.org/reading-room/whitepapers/bestprac/implementing-privilege-enterprise-1188.
Ravi Sandhu, David Ferraiolo and Richard Kuhn, The NIST Model for Role-Based Access Control: Towards a Unified Standard, http://csrc.nist.gov/rbac/sandhu-ferraiolo-kuhn-00.pdf.
IPART Essentials, On Behalf of: Customer Service Mode.

\* cited by examiner

FLEXIBLE ROLE BASED AUTHORIZATION MODEL

RELATED APPLICATION

This application is a continuation of U.S. application Ser. No. 14/041,203, entitled "Flexible Role-Based Authorization Model", and filed on Sep. 30, 2013, the disclosure of which is expressly incorporated herein by reference in its entirety.

BACKGROUND

Field

The present specification generally relates to authorization systems.

Technical Background

Access control is used to restrict system (or other) access to authorized functions and users (or their delegates) and is generally considered a form of computer systems security. It is often utilized in Web Access Management (WAM) to control access to web resources, perform authentication, facilitate policy-based authorizations, and more.

Different authorization solution models may be used separately or together to provide a robust access management system. Referring to FIG. 1, generally, these include agent authorization, business authorization, and securable object authorization. All three can be analogized to a gaining access to a secure apartment complex.

An Agent Authorization calculates whether one application is permitted to make a call/request to another application/service/etc. Using the secure apartment complex analogy, its gatekeeping function is whether the user can even find the apartment building.

A Business Authorization (possibly disposed in a WAM) calculates whether a particular user is permitted to access a given service (e.g., is user's subscription active? What restrictions apply? Is this a transactional purchase? Has the user undergone proper credentialing and asserted a permissible use for the requested access?). Again, using the secure apartment complex analogy, its gatekeeping function acts to determine if a user can enter the building when that user knocks on the door to the apartment building.

Business Authorizations may include content restrictions which are policies designed to prevent access to specific content sets by users in specific markets/geographies/royalty paradigms and may be vendor specified and/or contractually mandated. Content restrictions may need to be enforced by retrieval as well as search and alert modules/functions. Internal Content Restrictions may include internally (although not contractually) developed content restrictions that may be motivated by financial considerations (e.g., not offering high-revenue content to academic markets).

A Securable Object Authorization calculates more specific access within an application or via a service provider by governing how service providers control access to user generated content (e.g. folders, alerts, etc.). It utilizes policies governing which user identities, privileges allocated to those user identities, who owns the securable object, and what permissions have been assigned to that object to calculate whether a given request may be authorized. This phase of authorization may be likened to gaining access to a specific apartment in the building.

Role-based authorization may be utilized to assign permissions to perform certain operations to specific roles. Users, assigned to roles, acquire that role's permissions to access a given function. Role-based authorization supports the least authorization/privilege necessary for a task by allowing a product, a capability within a product, or a subset of capabilities to be usable only when certain roles attempt to access that set of data/functionality.

Prior art systems which utilize the Principle of Least Privilege require the user to have separate accounts for each role (s)he has been assigned. They also do not allow one authorized user to work on behalf of another user without having to logon as that other person or under a different identity. Prior art requires the user to re-authenticate (that is, to log off and then log back on again using different credentials) in order to switch from being a regular user to being an administrator or vice-versa.

Role-based authorization provides users access to product capabilities based on a combination of the user, their role, and the functionality sought by the user. A user, however, may not fit a one-size-fits-all role. Likewise, individually customizing a profile for each user of a system would result in significant overhead.

Thus, there is a need in the art to improve role-based authorizations through the provision of a set of role-based templates that may be customized to further meet specific needs. Additionally, there is a need to provide a user the ability to act on behalf of another user while validating both users' authorization for a request through the use of their assigned roles.

SUMMARY

Aspects and embodiments of the systems comprise varying depth and breadth in their functionality. The systems disclosed herein may also be computer machine implemented methodologies/processes as well as computer-executable instructions encoded on a computer-readable medium for execution on a computer machine.

In an aspect, a computer machine system comprises one or more computer machines and at least one computer memory comprising a rights database. The rights database may be configured to store a set of roles wherein each role is associated with one or more capabilities. The rights database may also store a set of user identifiers wherein each user identifier is associated a specific user; one or more roles from the set of roles; and one or more capabilities from each of the roles. The system may also include at least one policy decision point configured to authorize a service request received from a policy enforcement point. The policy decision point may determine if a first set of capabilities allocated to a first role, wherein said first role may be specified in a request header associated with the service request, matches a set of required privileges necessary to perform the service request. The policy decision point may determine if a second set of capabilities allocated to a first user, wherein the first user may be specified in the request header, acting as the first role matches the set of required privileges necessary to perform the service request.

In embodiments disclosed herein, the policy enforcement point may comprise a resource-based web service (e.g., a subscription service) further comprising a set of content and report functionality.

In embodiments disclosed herein, the request header may comprise at least two roles, the first role and a second role, wherein each role is assigned to a different user and wherein a second user is acting on behalf of the first user.

In embodiments disclosed herein, the policy decision point may determine if a second set of capabilities, assigned to the second role and associated with the second user, matches the set of required privileges necessary to perform the service request on behalf of the first user.

Embodiments disclosed herein may define the second user's role according to the capabilities associated with a customer care representative. These may be predefined according to the degree of power desired in the system.

In embodiments disclosed herein, the second user may not be able to authenticate as the first user (e.g., via password, thumbprints, retinal or iris scans, RSA tokens, voice, smart cards, etc.).

In another aspect, a computer machine system comprises one or more computer machines and at least one computer memory comprising a rights database. The rights database may be configured to store a set of roles wherein each role is associated with one or more capabilities. The rights database may also be configured to store a set of user identifiers wherein each user identifier is associated with a specific user; one or more roles from the set of roles; and one or more capabilities from each of the roles. The system may include at least one policy decision point configured to authorize a service request received from a computer machine configured to perform as a policy enforcement point. A first user may be identified in a request header associated with the service request. The policy enforcement point may determine which role, from a set of roles allocated to the first user, should be selected and compared against a set of required privileges necessary to perform the service request. The policy decision point may determine if a first set of capabilities allocated to the selected role matches the set of required privileges necessary to perform the service request. The policy decision point may determine if a second set of capabilities allocated to a first user, wherein said first user may be specified in the request header, acting as the selected role, matches the set of required privileges necessary to perform the service request.

In embodiments disclosed herein, the policy decision point may receive which role should be selected and compared based on a role selection performed by the first user. For instance, the policy enforcement point may call the policy decision point and pass in a request header for the role to be used for comparison against a set of roles. Role-specific capabilities of the user may also be specified in a request header. The policy decision point returns a computer machine output, for each of these capabilities, indicating whether the user in question, acting in the role in question, is authorized to that capability.

In embodiments disclosed herein, the policy decision point may receive an active role parameter in the request header.

In embodiments disclosed herein, the policy decision point may receive which role should be selected and compared based on assessing which of the set of roles comprises a minimum set of capabilities necessary to perform the service request.

In embodiments disclosed herein, the policy decision point may request additional authentication if the selected role comprises a more advanced set of capabilities than another role from the set of roles allocated to the first user.

In embodiments disclosed herein, an application associated with the service request may charge a department associated with the first user's role.

In embodiments disclosed herein, the policy decision point may return a set of authorizations to a policy enforcement point, encoded with an application associated with the service request, based on both the selected role and the second set of capabilities allocated to the first user.

In another aspect, a computer machine implemented authorization process comprises receiving a service request at a policy enforcement point, from an application, further comprising a first request header identifying a first user and a first role. The process further comprises sending an authorization request to a policy decision point further comprising a second request header identifying the first user and the first role and receiving, from the policy decision point, an authorization or a denial to perform one or more aspects of the service request wherein the service request may only be granted for a specific set of capabilities defined in a computer memory for both the first user and the first role.

In embodiments disclosed herein, a first set of capabilities associated with the first user may be a subset of a second set of capabilities associated with the first role.

In embodiments disclosed herein, the request header may further identify a second user and a second role that the second user selected to indicate in which capacity the second user is acting and the second request header may identify the second user and the second role. The process may include receiving, from the policy decision point, an authorization or denial to perform one or more aspects of the service request wherein the service request may only be granted for a specific set of capabilities defined in a computer memory for all of the first and second users and the first and second roles.

In embodiments disclosed herein, the second user may be acting on behalf of the first user.

In embodiments disclosed herein, the first role may be selected by the first user from a set of possible roles assigned to the first user.

In embodiments disclosed herein, the first role may be selected by the policy decision point, from a set of possible roles assigned to the first user, according to a least privilege principle.

In embodiments disclosed herein the policy enforcement point receives the denial if the service request requires a different role.

It should also be understood that various aspects and embodiments may be mixed and matched without departing from the ambit of the disclosure provided herein.

BRIEF DESCRIPTION OF THE DRAWINGS

The following detailed description of the illustrative aspects and embodiments can be understood when read in conjunction with the following drawings, where like structure is indicated with like reference numerals and in which.

DETAILED DESCRIPTION

Figure 1:
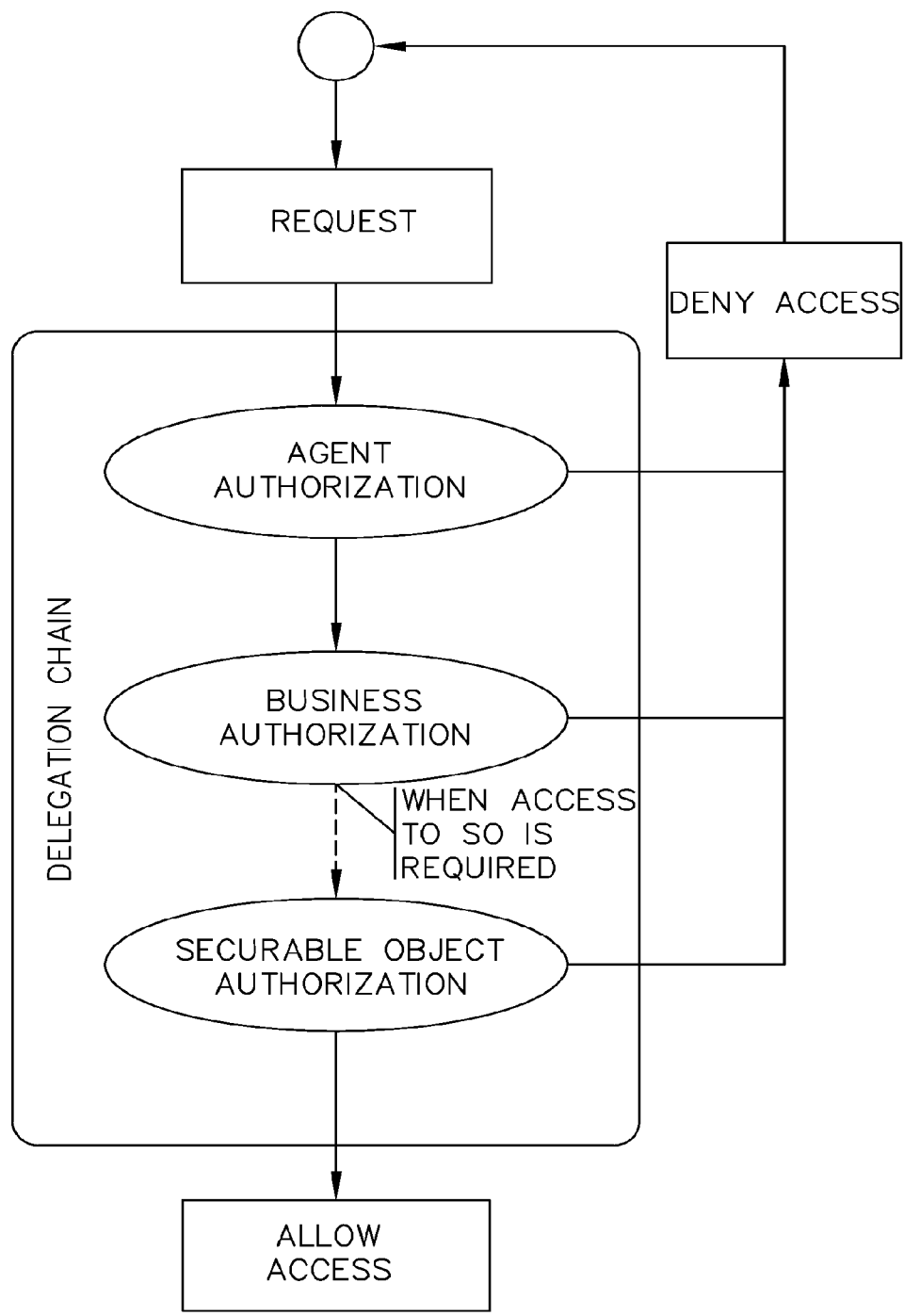
FIG. 1 provides an exemplary authorization model.

The drawings, systems and methods described herein relate to role-based authorization systems.

General Definitions

"Active Role" refers to the role representing the type of responsibility the user is currently pursuing as part of his/her interaction with the computer system in question and may be encoded in a computer memory.

"Automatically" means the use of a machine to conduct a particular action.

"Calculate" means determining or ascertaining a result or computer machine output from a computer machine input using a computer machine.

"Communications Medium" includes both wired and wireless modes of electronic communication including but not limited to digital, analog, and other such forms of communication known in the art.

"Computer Machine" means a machine (e.g., desktop, laptop, tablet, smartphone, kiosk, television, server, as well as other current or future computer machine instantiations) containing a computer processor that has been specially configured with a set of computer executable instructions (a computer machine may also be deployed within other machines). References to "at least one" computer machine are intended to encompass both autonomous systems and sub-systems as well as situations where a given functionality might be divided across multiple machines (e.g. parallel processing) for efficiency or other purposes.

"Computer Machine Input/Output" means input/output received/produced by a computer machine.

"Computer Memory" is non-transitory computer-readable data storage. As described herein, it may be non-volatile, non-transitory RAM, ROM, a flash memory, a hard drive, or any device capable of storing machine readable instructions and/or data.

A "Customized Role" includes a data structure stored in computer memory embodying an individualized customization of a default set of parameters.

"Enterprise Service Bus" (ESB) is a computer machine that may act as an intermediary between the requester of a function (including access to data) and the provider of that function. The ESB can act as a PEP because it intercepts message/requests and can process/mediate them as they flow between a service requester and a service provider. An ESB may be used to govern what applications are allowed to call which services as part of a Service Oriented Architecture (SOA).

"Exemplary" means giving an example; serving as a non-limiting illustration or example of something.

"For Role" refers to which role, of one or more roles allocated to a user for whom work is being done, should be used to check that user's authorizations, when a second user is doing work on their behalf. The "for role" may be encoded in a computer memory.

A "Header" may be included with a request and contain information about the file or transmission associated with the request.

"Principle of Least Privilege" refers to the concept of utilizing the account and/or role with the lowest level of authorization necessary to perform a given task. For instance, User A may have administrative access to the system when acting as an administrator. But, User A may also have a user account and/or role to which they have been granted "Read Access" to User B's account. If User A is acting as a user then they should not be able to utilize the rights available to them under their administrative role. Thus, when acting as a user, User A should be logged in as a User not as an Administrator.

"Network Interface Hardware" may include any wired/wireless hardware generally known to those of skill in the art for communicating with other networks and/or devices.

A "Policy Decision Point" (PDP) means a computer machine which assesses whether a request may be authorized.

A "Policy Enforcement Point" (PEP) means a computer machine which executes a request if authorized and refuses to execute a request if not authorized.

A "Processor" means any processing component configured to receive and execute instructions (such as from the data storage component and/or computer memory component) and may include a controller, an integrated circuit, a microchip, a computer, or any other computing device. References to first and second processors may reside in different specially coded computer machines or may be a single computer machine that is specially encoded with different computer executable instructions stored on the same processor. References to first and second processors within a given configuration are for purposes of convenience and not intended to be limiting as various configurations are possible and would be known to one of skill in the art.

"Request Header" includes the properties of a request. They may be utilized/aligned with any protocol including, but not limited, to HTTP.

A "Role" includes a data structure stored in computer memory representing a collection of behaviors and characteristics appropriate to a given type/class/group. It may be represented as a collection of behaviors and characteristics appropriate to a given type of responsibility that characterize a type of class/group of users who are assigned that responsibility.

A "Role-Based Authorization" includes calculating whether a user, acting in a role, may use a product/product capability that is associated with a level of authorization encapsulated by an indication of the roles/characteristics permitted to use such product/product capability.

A "Server" means a customized computer machine or a general purpose computer machine with the requisite hardware, software, and/or firmware. A server may include a processor, input/output hardware, network interface hardware, a data storage component (which stores data and/or metadata) and a memory component configured as volatile or non-volatile memory including RAM (e.g., SRAM, DRAM, and/or other types of random access memory), flash memory, registers, compact discs (CDs), digital versatile discs (DVD), and/or other types of storage components. A memory component may also include operating logic that, when executed, facilitates the operations described herein.

"Web Access Management (WAM)" refers to various forms of identity management to access web resources. Such systems may be custom-coded and may also be available off-the-shelf such as Oracle's Work & Asset Management Administration. It is also possible to customize an off-the-shelf system. The WAM may serve as the Policy Decision Point to determine whether to allow or deny a given request.

"Web Services" describes a standardized way of integrating Web-based applications using the XML (tagging), SOAP (transfer protocol), WSDL (web service dynamic language for describing available services) and UDDI (lists available services). Web-based applications may also be integrated utilizing RESTful web services that do not involve the use of SOAP or mandate the representation of request/response structures as XML documents. It should apply no matter what type of service approach is being used—whether it be web services, CORBA (COmmon Request Broker Architecture) services, or some other form of service mechanism. They allow organizations to communicate data without knowledge of systems behind the firewall.

With these definitions established, the structure and operation of various embodiments of systems and methods for flexible role based authorization are now described.

Roles

Embodiments disclosed herein utilize a set of role templates. Each role may be associated with a tailored profile for access authorization, directed toward a particular group of users, that may be further customized by a system administrator. This allows a richer array of possible access without burdening the system or users with a plethora of user roles (which could be nearly infinite depending on how many different toggles are utilized within a given role) or alternatively, laboriously configuring every user's rights from scratch.

Embodiments disclosed herein may also allow one user to do work on behalf of another in a responsible, trackable way that can check each specific authorization against the appropriate user's authorized capabilities (User A is requesting work to be done on behalf of User B). Roles may be implicitly or explicitly allocated and new roles may be created/defined anytime. Furthermore, roles are not necessarily dependent a specific real-world hierarchy.

Embodiments disclosed herein may select from a plurality of roles including, but not limited to, user, regulated data, administrator, and customer care. Definitions of each role and/or a role template may be stored in a computer memory. Users/Customers may be initially set in the "User Role" but may be allocated additional roles available in the system. It is possible for a user to have more than one role or even overlapping privileges across roles and to choose which role they wish to act under when they login to a given system.

Likewise, a given product with more than one functions/content sources may have multiple roles associated with it such that a given user will only be able to access a subset (from none to the entire range of functionality/content) of functions/content sources that match the roles assigned to the given product.

Interface

Role-based authorization may be granted to a user so long as the role associated with the user includes an authorization for the requested function. An access management module may remove authorizations previously granted to a given user if they become associated with a different role than the one for which they were initially granted access. Alternatively, an access management facility can add or remove roles from a user. It can also add or remove role-specific capabilities for a user that are associated with roles allocated to the user.

User roles may have customizable profiles for access authorization that may be toggled off/on by a system administrator. This allows a richer array of possible access without burdening the system or users with a plethora of user roles (which could be nearly infinite depending on how many different toggles are utilized within a given role) or alternatively, laboriously configuring every user's rights from scratch.

Agent Deployment

Agents of a given user may be able to access functions/content. For example, a company may hire outside counsel that does not subscribe to a paid database that the company has a paid subscription to utilize. Rather than be billed extra for a different use or for a one-time use of the database that they have already paid for, it may be possible for a user role to allow a third party to act "in their place" for purposes of utilizing the paid database for a limited engagement.

Roles may allow a customer service representative to access a site on behalf of an end-user for the purpose of setting up a cart, set of alerts, etc. that an end-user may want to access later. The end-user, however, may not wish to hand out their user name and password for security reasons. Alternatively, a customer care representative may be able to redeliver jobs (re-retrieve content) on behalf of a user without having to access sensitive information from the user.

Customer service representatives may act "on behalf" of a user and facilitate a user's request. For example, State Net®, a LexisNexis® product, delivers vital data, legislative intelligence and in-depth reporting for people who care about the actions of government. See, http://www.statenet.com/about/. State Net may require a customer service representative (CSR) to override the charges associated with a particular transaction and give it to the client for free (e.g., in a troubleshooting scenario) but, for security purposes, State Net does not want the CSR to have access to the user's password, for example. By providing the CSR with a "role" to act on behalf of a given customer, the CSR may proceed to act within the authorization of both the user requesting the service as well as their own authority as a CSR for the product. Thus, authorizations associated with a user role(s) (whether the first user doing the work or on whose behalf the work is being done, or those of a second user acting on behalf of the first user) may be checked against an internal customer representative database(s).

Process

Fields may be added to a request header in a message enclosing a given request to identify for the Policy Decision Point (PDP) or "decision maker" information identifying the user making the request and what role that user is acting in for purposes of the request. If the request seeks to do work on behalf of second user, the header may also include the identity of that second user and the role for that second user under which work is to be done for him/her. The PDP can determine if the request is authorized under the parameters provided as computer machine input.

When work is to be done by one user on behalf of a second user, a variable may be set in a request header to identify the user on whose behalf the request are being made. This is not the user submitting the request but the user whose authorizations are to be used where appropriate as part of satisfying the request.

When work is to be done by one user on behalf of a second user, a variable may be set in a request header to identify the role associated with the "for user" or the role whose authorizations should be checked against the authorizations assigned to the "for user" identity.

If these variables are not set, a default role may be assumed so that an appropriate set of privileges may be made available in the context of servicing a given request. The default role for a given implementation may be implementation-specific and determined at the time of implementation or via an administrator at a later date. This allows a system to constrain authorizations that can be brought into play so that powers are not misapplied in inappropriate circumstances.

Request headers may be formulated by the customer-facing application to specify the identity of the user making the request and the role in which that user is acting at the time. If a given application fails to specify an active role in its request headers, a default role may be assumed (preferably this default role would be whichever role is the least powerful in the system).

If a service handling a request must interact with other services as part of its processing for the request, it may propagate the same request headers to these subsequent services as part of its request. Thus, services involving a chain of interactions may pass along the request header identifying user and role to the PDP associated with each service. Whatever asset initiates a chain of service requests may set the active role for the user in the request header. All other services may propagate the active role value to subsequent services. A given user may set the role they are acting under if they have more than one role. Alternatively, a specific role may be allocated to a given user based on the asset they are seeking to request services from and the active role may be set automatically. Thus, the selection of the role in which the user is to act may be explicitly offered by the application that initiates a service request for the user or it may be implicit in the selection of a specific function through the application or the choice of the application itself.

The WAM may populate the "for user" identifier and role in the request header. An application may call WAM to set new request header values specifying "for user" and the role to be associated with the "for user". Before declaring a user authorized, WAM may validate that a submitting user and current role actually support an authorization to do work on another's behalf and that the role to be associated with the "for user" identity has been allocated to that user:

A set of roles associated with the role-authorized product includes user's active role A user has been allocated the active role A user has been assigned that authorization Other features may include a time-out so that a user cannot indefinitely act on behalf of another.

A PDP may access a record stored in computer memory which maintains a list of users, their roles, and permissions provided with regard to a given function and that role. A PDP may use (1) the identity of the user submitting the request from the request headers; (2) that user's active role from the request headers; and (3) the role with which each authorization to be checked is associated.

When doing work on behalf of another user involving manipulation of Securable Objects (e.g., specific folders or alerts), the objects belonging to the "for user" are the ones to vet for authorization (not objects belonging to say, the customer service representative). So, when a "for user" request header attribute is present, the "for user" identity may be evaluated to identify the securable objects available for manipulation and the permissions to use for access to such objects.

When an application offers the capability to allow a first user to do work on another user's behalf, two additional request headers may be added a request: (1) the identity of the second user on whose behalf work is to be done and (2) the role associated with that second user on whose behalf the work is to be done. Within the scope of a given request, a user may be acting under the authorizations of one role. Thus, in a customer care scenario, for example, requests submitted by a customer care representative on behalf of a customer may have an request header carrying at least four values:

Identity of the submitting user (e.g., the customer care representative)

Active role for the submitting user (e.g., the customer care role)

Identity of the user for whom—on whose behalf—the request is being submitted (e.g., the customer user for whom work is to be done by CSR)

The role for the user for whom work is to be done (e.g., the customer user role)

If the value of a role header is absent for a given request, the PDP may assume a default role—typically the least privileged role in the system (in keeping with the principle of least privilege). Application features for which a different role is required may specify whichever role is appropriate to the task at hand in the request header, rather than allow the default to be assumed. Each role may be associated with an authentication profile that indicates a degree of confidence in a given user's identity in order to leverage that role's capabilities (for security or other purposes). If a role being specified for the submitting user requires a greater degree of confidence than the user's initial access to the system, the PDP may demand additional authentication factors (e.g., that the request originate from a specific IP address range when IP-based protocols are used, a value generated by an RSA token, entry of a one-time code value that is emailed to the user at the time the additional authentication confidence is required, and/or various other possible mechanisms). These requests can be communicated by the PDP to the requesting PEP, which can then relay them back to the originating application for interactions with the user if necessary. Regardless, the user may retain their identity (i.e., not have to logoff and re-logon) and simply provide one or more additional factors to validate their current identity with greater confidence. Embodiments may allow a user to be associated with one identity (i.e., rather than multiple identities with separate logging/usernames/passwords/etc. requirements), whose various roles are brought into play based on the functionality that user employs within the system's applications.

When the application or service in question calls the PDP to determine if each of the requested capabilities is authorized, the PDP may evaluate each capability to determine the role or roles with which it is associated. If the set of roles associated with a given capability includes the request-header-specified role of the second user on whose behalf work is being done, the PDP may then evaluate if the first user is also authorized to act on behalf of that second user before validating or authorizing the request. If neither of these checks yields a positive assessment of authorization to the capability, the PDP may report a computer machine output that the capability in question is not authorized for this request. Alternatively, when an application or service calls the PDP to determine the authorization for a list of one or more capabilities, the PDP may evaluate the authorization for each requested capability as follows: (1) identify the role associated with that capability; (2) determine which—if any—of the role headers for this request match that role, and if none then identify that capability as not being authorized; (3) see if the user, associated with that role in the request header, has been assigned that role and more specifically that particular capability within that role—and only if that user has been assigned that capability should that capability be identified as being authorized. If the request header for this request carries multiple user-role pairs, the role associated with the submitting user must include the capability to do work on behalf of another user and that submitting user must have been assigned that specific capability within that role.

EXAMPLES

According to the embodiments described herein, an endless variety of workflows may be described but this section will highlight a few exemplary, non-limiting scenarios utilizing the following hypothetical but exemplary chart of roles and capabilities.

TABLE 1

| Role | Capability |
| --- | --- |
| Staff | Access to Type S1 data |
|  | Access to Type S2 data |
| Manager | Access to Type M1 data |
|  | Access to Type M2 data |
| Support | Do work on behalf of another user |
|  | Run report at no charge to department |
| User | Role |
| Claude | Staff |
| Chris | Staff |
|  | Manager |

TABLE 1-continued

| Role | Capability |
| --- | --- |
| Pat | Staff |
|  | Support |
| User | Capability |
| Claude | Access to Type S1 data |
| Chris | Access to Type S2 data |
|  | Access to Type M2 data |
| Pat | Access to Type S1 data |
|  | Access to Type S2 data |
|  | Do work on behalf of another user |
|  | Run report at no charge to department |

Example 1

User is Assigned the Active Role of Staff

Figure 2:
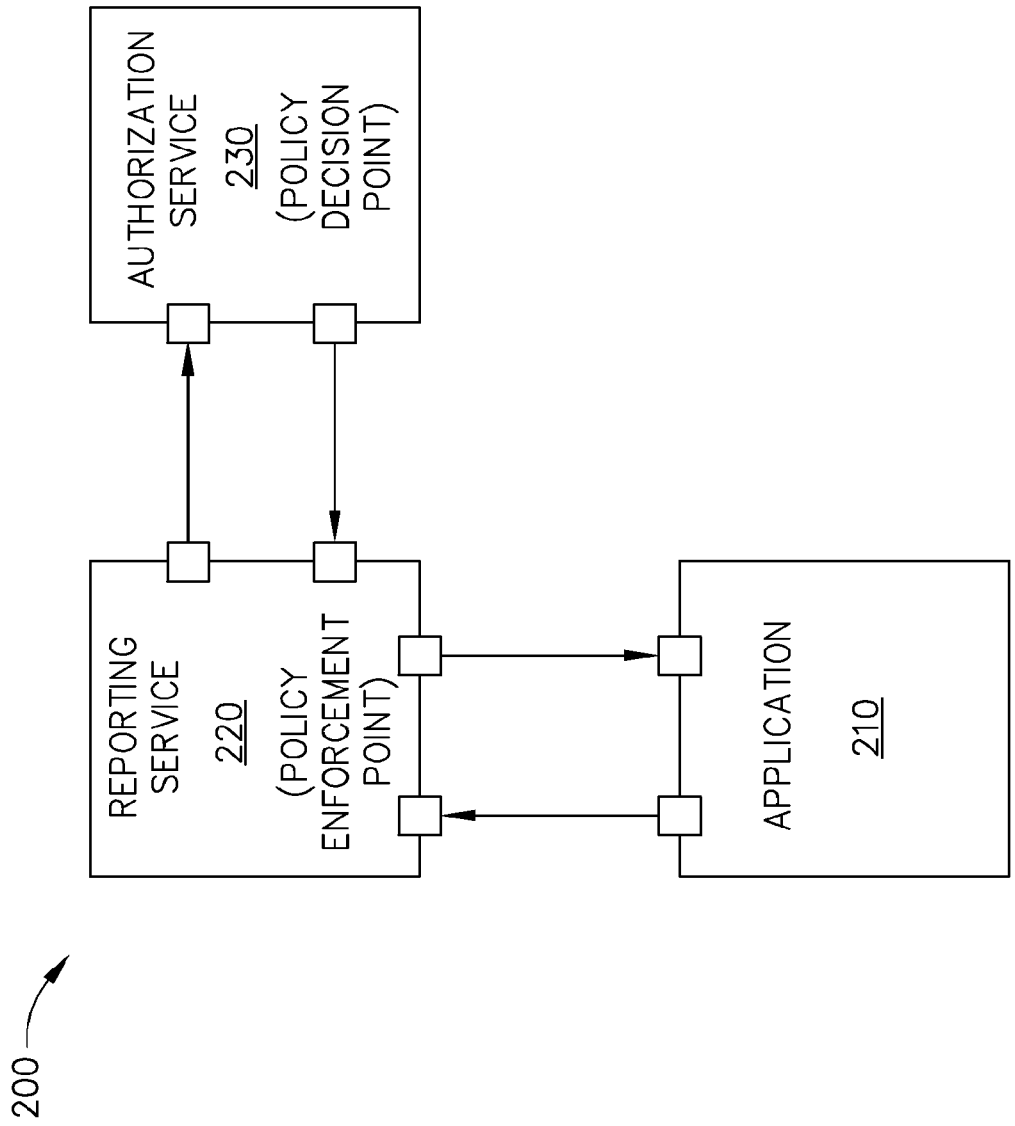
FIG. 2 provides an exemplary communication flow for embodiments disclosed herein.

Referring generally to FIG. 2, in this example, Claude requests a report through a user interface (UI) (e.g., graphical, textual, multi-modal, speech-based, etc.) using the option for Staff Members. Claude is assigned the role of Staff (in this example, the only option available) by the Application (210) (e.g., a subscription based application). This means that Claude is only allowed access to S1 data because that is the only staff-role authorization assigned to Claude. The Request Header may include the following user parameters: Active User=Claude; Active Role=Staff. The request header may be sent by the Application (210) to the Reporting Service (which also serves as the Policy Enforcement Point) (220). The Reporting Service (220) needs to "know" if Claude, acting in his current role as Staff, is permitted to receive the requested report (and, possibly, what information the user is authorized to receive in the report) and will request an Authorization Check with an Authorization Service (which serves as the Policy Decision Point (PDP)) (230). The PDP (230) utilizes the user parameters "active user" (Claude) and "active role" (Staff) and checks which data repositories Claude may be granted access to for his requested report (e.g., S1, S2, M1 and M2). The Authorization Service or PDP (230) returns a response to the Reporting Service (220) with the approved authorizations toggled (S1 —Yes, S2 —No, M1 —No, M2—No). Reporting Service (220) then returns a response comprising the requested report utilizing S1 data for its contents back to the Application (210) and charges Claude's department for the request.

Example 2

User with Two Possible Roles Chooses to Act as Staff

Referring generally to FIG. 2, in this example, Chris requests a report through a UI of the Application (210). Chris has two role options available: Staff and Manager. Chris as a staff member may access S2 data (note: this is different than Claude's privileges as Staff in the previous example where he was only granted access to S1 data). Chris, as a manager, may access M2 data. In this example, Chris is assigned the role of staff (either as a function of the application or as a choice made by Chris actively). This means, that Chris is only allowed access to S2 data. The Request Header may include the following user parameters: Active User=Chris; Active Role—Staff. The request header may be sent by the Application (210) to the Reporting Service (which also serves as the Policy Enforcement Point) (220). The Reporting Service (220) needs to "know" if Chris, acting in his current role as Staff, is permitted to receive the requested report and will request an Authorization Check with an Authorization Service (which serves as the Policy Decision Point (PDP)) (230). The PDP (230) utilizes the user parameters "active user" (Chris) and "active role" (Staff) and checks which data repositories Chris may be granted access to for his requested report (e.g., S1, S2, M1 and M2). The Authorization Service or PDP (230) returns a response to the Reporting Service (220) with the approved authorizations toggled (S1—No, S2—Yes, M1—No, M2 —No). Reporting Service (220) then returns a response comprising the requested report utilizing S2 data for its contents back to the Application (210) and charges Chris' department for the request.

Example 3

User with Two Possible Roles Chooses to Act as a Manager

Referring generally to FIG. 2, in this example, Chris requests a report through a UI. Chris has two role options available: Staff and Manager. Chris as a manager may access M2 data. In this example Chris is assigned the role (either as a function of the Application (210) or as a choice made by Chris actively) of manager. This means, that Chris is only allowed access to M2 data. The Request Header may include the following user parameters: Active User=Chris; Active Role—Manager. The request header may be sent by the Application (210) to the Reporting Service (which also serves as the Policy Enforcement Point) (220). The Reporting Service (220) needs to "know" if Chris, acting in his current role as Manager, is permitted to receive the requested report (and, possibly, what set of information may be included in the report) and will request an Authorization Check with an Authorization Service (which serves as the Policy Decision Point (PDP)) (230). The PDP (230) utilizes the user parameters "active user" (Chris) and "active role" (Manager) and checks which data repositories Chris may be granted access to for his requested report (e.g., S1, S2, M1 and M2). The Authorization Service or PDP (230) returns a response to the Reporting Service (220) with the approved authorizations toggled (S1—No, S2—No, M1—No, M2—Yes). Reporting Service (220) then returns a response comprising the requested report utilizing M2 data for its contents back to the Application (210) and charges Chris' department for the request.

Example 4

User is Assigned a Role

Referring generally to FIG. 2, in this example, Pat requests a report through a UI of the Application (210). Pat has two role options available: Staff and Support. Pat as Staff may access S1 and S2 data. Pat as Support may (1) work on behalf of other users; and (2) run reports for others at no charge. In this example, Pat is assigned the role (either as a function of the Application (210) or as a choice made by Pat actively) of Staff. This means, that Pat is only allowed access to S1 and S2 data. The Request Header may include the following user parameters: Active User=Pat; Active Role=Staff. The request header may be sent by the Application (210) to the Reporting Service (which also serves as the Policy Enforcement Point) (220). The Reporting Service (220) needs to "know" if Pat, acting in his current role as Staff, is permitted to receive the requested report (and, possibly, what information may be included therein) and will request an Authorization Check with an Authorization Service (which serves as the Policy Decision Point (PDP)) (230). The PDP (230) utilizes the user parameters "active user" (Pat) and "active role" (Staff) and checks which data repositories Pat may be granted access to for his requested report (e.g., S1, S2, M1 and M2). The Authorization Service or PDP (230) returns a response to the Reporting Service (220) with the approved authorizations toggled (S1—Yes, S2—Yes, M1—No, M2—No). Reporting Service (220) then returns a response comprising the requested report utilizing S1 & S2 data for its contents back to the Application (210) and charges Pat's department for the request.

Example 5

User Requests a Free Report

Referring generally to FIG. 2, in this example, Pat requests a report through a UI of the Application (210) for himself. Pat has two role options available: Staff and Support. Pat as Staff may access S1 and S2 data (but not for free). Pat as a Support may (1) work on behalf of other users; and (2) run reports for others at no charge. In this example, Pat is assigned the role (either as a function of the Application (210) or as a choice made by Pat actively) of Staff. This means, that Pat is only allowed access to S1 and S2 data (but not for free). The Request Header may include the following user parameters: Active User=Pat; Active Role=Staff. The request header may be sent by the Application (210) to the Reporting Service (which also serves as the Policy Enforcement Point) (220). The Reporting Service (220) needs to "know" if Pat, acting in his current role as Staff, is permitted to receive the requested report for free and will request an Authorization Check with an Authorization Service (which serves as the Policy Decision Point (PDP)) (230). The PDP (230) utilizes the request header parameters "active user" (Pat) and "active role" (Staff) to determine the authorizations requested by the Report Service (220) regarding the report (e.g., what data is authorized: S1, S2, M1, and M2, and whether the report can be generated for free as requested). The Authorization Service or PDP (230) returns a response to the Reporting Service (220) with the approved authorizations toggled (S1—Yes, S2—Yes, M1—No, M2—No, Report at No Charge?—No). Reporting Service (220) then returns a response comprising the requested report utilizing S1 & S2 data for its contents back to the Application (210) and charges Pat's department for the request. Note that, here, Pat cannot utilize his ability to request free reports when he is merely acting as himself—he must be acting in his role of Support to obtain access to the ability to waive charges. According the Principal of Least Privilege, if Pat's present use of the system (200) is not entitled to a higher level of authorization, then the system should deny his request to take advantage of the "perks" of that role.

Example 6

User Request a Free Report for Another User

Figure 3:
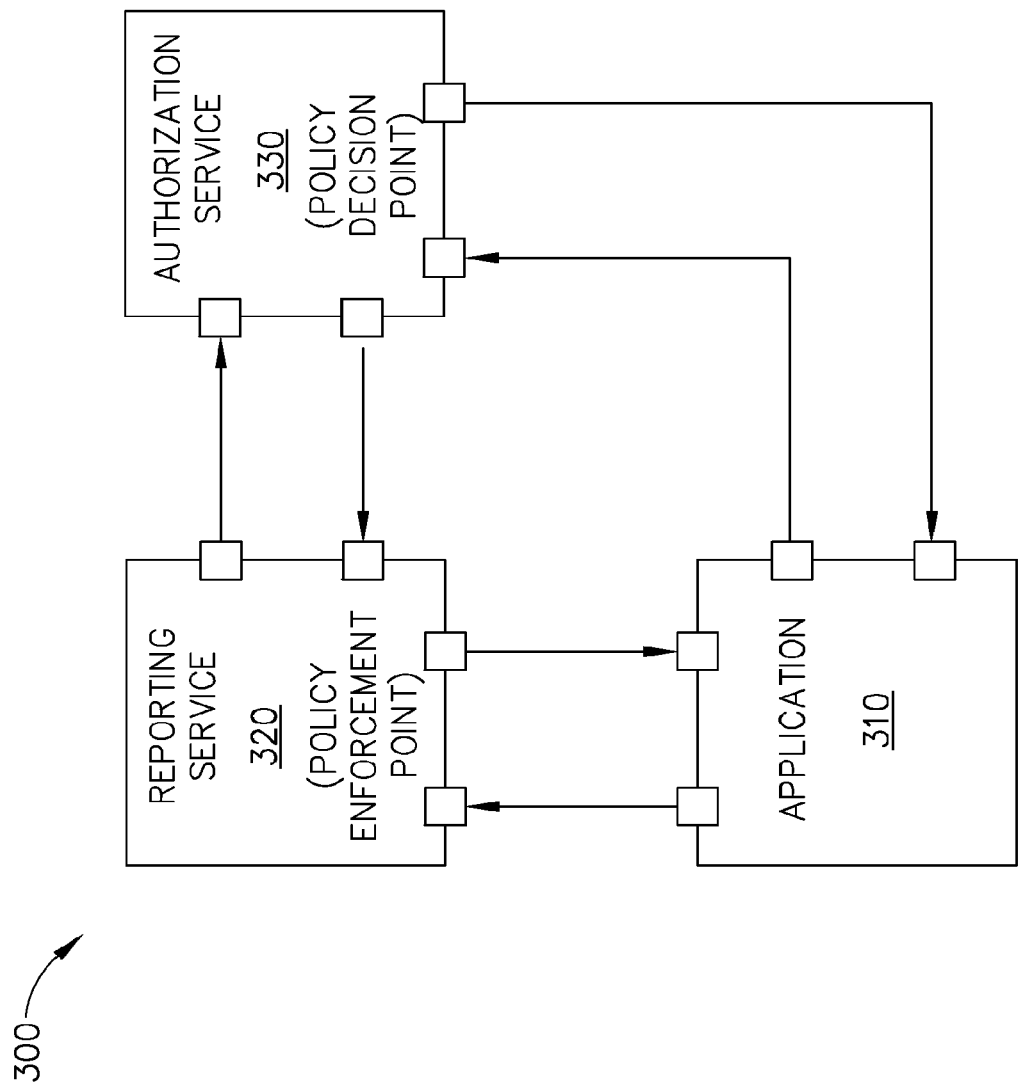
FIG. 3 provides an alternative exemplary communication flow for embodiments disclosed herein.

Referring generally to FIG. 3, in this example, Pat requests a report through a UI on behalf of Claude. Pat requests to create a staff member report for Claude at no cost to Claude's department (e.g., operational issues caused Claude's most recent request for a report to produce a report that was missing some data that should have been included). Pat has two role options available: Staff and Support. Pat as Staff may access S1 and S2 data. Pat as a Support may (1) do work on behalf of other users; and (2) run reports for others at no charge. Claude as a staff member is only allowed to see S1 data in his reports.

Here, the system (300) is first configured to facilitate the request on behalf of another. The Application (310) may send a request to "Prepare headers to enable work to be done for Another user" to the PDP (330) in which the request header "Active User" is set to identify Pat and the "Active Role" is set to "Support." As explicit parameters—not as header values—on this call, the Application (310) identifies that the work to be done is for user Claude and in Claude's role as a "Staff" member. The PDP (330) then checks Pat's authorized capabilities under the "Support" role and indeed verifies that Pat is allowed to do work on behalf of others. The PDP (330) would then generate—and return to the Application (310)—modified headers that contain not just "Active User" (set to identify Pat) and "Active Role" (set to "Support") but also "For User" set to identify Claude and "For Role" set to "Staff." The PDP (330) may optionally include additional header attributes that allow the "For User" and "For Role" headers to be used only for a limited time period, checked for possible tampering, or other optional security safeguards—all in accord with the company's security policies. Because the request to "Prepare headers to enable work to be done for Another user" was successful, the Application (310) then configures and sends the request (seeking a report at no charge) to the Reporting Service (320). Again, the user parameters that were previously approved are sent as attributes of the message header (e.g., "For User"="Claude"; "For Role"="Staff", "Active User"="Pat" and "Active Role"="Support"). Given these header settings, any report Pat requests will be limited to the S1 data allowed to "For User" Claude. The Reporting Service (320) needs to "check" if Pat, acting in his current role as Support for Claude, is permitted to receive the requested report (and, possibly, the set of information requested for the report as well as whether it may be provided for free) and will request an Authorization Check with an Authorization Service (which serves as the Policy Decision Point (PDP)) (330). The PDP (330) may use the request header settings for "Active User" (Pat), "Active Role" (Support), "For User" (Claude) and "For Role" (Staff) to evaluate the various capability authorizations requested by the Report Service (320)—namely whether to include S1, S2, M1 and/or M2 data, and whether the report may be issued at no charge. The Authorization Service or PDP (330) returns a response to the Reporting Service (320) with the approved authorizations toggled (S1—Yes, S2—No, M1—No, M2 —No, Report at No Charge? —Yes). Reporting Service (320) then returns a response comprising the requested report utilizing S1 data for its contents back to the Application (310) but does not charge either Claude or Pat's department for the request.

Additional Variations

Embodiments may provide the ability to vet three or more roles for a single transaction. For instance, if a customer service representative needs to act in an administrative capacity for another user, it is possible that three separate authorizations may need to be coordinated.

Other embodiments disclosed herein may utilize two tiers of checking. For instance, under "Active Role" two parameters may be configured: a) the role (e.g., Customer Care; and b) the specific user ID of the person acting in that role (e.g., Pat). A PDP may check to make sure that the request is, in the first place, aligned with the role specified in the request header. If not, the request may be denied. For instance, if "Support" requests the ability to credit a user's account, the PDP should deny this (according to the rights outlined in Table 1) because credit functions are not specified as a privilege for Support roles. Once the PDP determines that the role and the request are a match, then the PDP may analyze the specific UserID (e.g., Pat) to make sure that, out of the world of possible rights that may be granted to a Support role, Pat has been granted that specific function/access/privilege/etc.

Another feature allows the second person's authorizations to do work on behalf of the first person and also to enable additional aspects of the requested functionality. For instance, a Support role may offer the ability to do work on behalf of another user but also enable that work to be done for free if the Support role person requested such. The additional aspects that might be enabled by/through the second user's authorizations could be just about anything that the first user would be unable to do on his/her own authorizations as part of the functionality requested. In general, the PDP may be handed a list of capabilities to be checked for authorization. Each one may be associated with a single role. The PDP may find the role associated with the capability being checked at the moment, and check to see if any of the roles identified in the request header match the role with which that capability is associated. If none of them do, that capability is not authorized for the request. If it does match one of the header roles, the user associated in the request header with that role is checked to see if (s)he is authorized for that role and that specific capability within that role. If yes, that capability is authorized for this request, and if not, then that capability is NOT authorized for this request. Thus, the mix of capabilities to be checked can be any mix of capabilities associated with the first user role or the second user role—or even some role not represented by any of the roles in the request header.

The various rights, privileges, roles, and user specifications may be stored in one or more computer memories and accessible as computer machine input/output via requests from computer machines.

Embodiments of a flexible role-based authorization system may be designed from scratch or a pre-existing application may be retrofitted to interact with a service via a WAM system so that the necessary authorization may be validated. Variations may provide different front-end interfaces, depending on the specific role a given user is acting as, to avoid confusion (e.g., if a user may act in either an Administrative or User capacity but, at a given moment, is acting as a User, then their front-end interface should reflect the choices actually available to them (e.g., not provide a "Delete Account" button as this is not functionality that may be normally offered to a mere user)).

Technical Variations

According to the embodiments described herein, any of the systems, logic and devices can be implemented as machine readable instructions in any programming language of any generation (e.g., 1GL, 2GL, 3GL, 4GL, or 5GL) such as, e.g., machine language that may be directly executed by a Processor, or assembly language, object-oriented programming (OOP), scripting languages, microcode, etc., that may be compiled or assembled into machine readable instructions and stored on a machine readable medium contained in a Computer Machine. Alternatively, such computer-executable instructions may be implemented in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

Embodiments of the present disclosure may include one or more processors embedded in a computer machine.

Processes by which data is extracted, organized and stored may be an automatic process and may utilize a computer machine or be conducted over a computer network (e.g., wide area network, such as the internet, a local area network, a mobile communications network, a public service telephone network, and/or any other network and may be configured to electronically connect a user computing device (e.g., a PC) and a server computing device (e.g., cloud, mainframe, or other server device)).

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. The diagrams and representations are all provided for exemplary purposes. The illustrative diagrams and charts may depict process steps or blocks that may represent modules, segments, or portions of code that include one or more executable instructions for implementing specific logical functions or steps in the process upon a Computer Machine. In various embodiments, described processing steps may be performed in varying order, serially or in parallel. Alternative implementations are possible and may be made by simple design choice or based on, for example, considerations of function, purpose, conformance to standard, legacy structure, user interface design, and the like. Additionally, execution of some functionality, which would be considered within the ambit of one skilled in the art, may or may not be disclosed herein. Finally, variances may be omitted without departing from embodiments disclosed herein.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program embodied on a non-transitory computer-readable medium to perform functions by operating on computer machine input and generating computer machine output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory. These capabilities may be performed in the current manner or in a distributed manner and on, or via, any device able to provide and/or receive information. Still further, although depicted in a particular manner, a greater or lesser number of modules and connections can be utilized with the present disclosure in order to implement or perform the various embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A system comprising:
a processing device; and
a non-transitory, processor-readable storage medium, the non transitory-processor-readable storage medium comprising one or more programming instructions that, when executed, cause the processing device to:
receive a service request comprising a request header specifying a first role and a second role from a set of roles, wherein each role of the set of roles is associated with one or more capabilities,
determine that a first set of capabilities from the one or more capabilities allocated to the first role matches a set of required privileges necessary to perform the service request,
assign the first role to a first user and the second role to a second user, wherein the second user is acting on behalf of the first user,
determine that a second set of capabilities from the one or more capabilities is allocated to the first user, wherein the first user is specified in the request header as acting in the first role by matching a set of required privileges necessary to perform the service request, and
determining that a third set of capabilities from the one or more capabilities is assigned to the second role and associated with the second user by matching the set of required privileges necessary for the second user to perform the service request on behalf of the first user in the first role.

2. The system of claim 1, wherein the system is a resource-based web service comprising a set of content and report functionality.

3. The system of claim 1, wherein the system is a policy decision point machine.

4. The system of claim 1, wherein the second role is defined according to one or more capabilities associated with a customer care representative.

5. The system of claim 1, wherein the second user cannot authenticate as the first user.

6. The system of claim 1, wherein the set of roles comprises a user role, a regulated data role, an administrator role, and a customer care role.

7. The system of claim 1, wherein the request header comprises information that identifies at least one of the first user and the second user.

8. The system of claim 1, wherein the processor-readable storage medium further comprises one or more programming instructions that, when executed by the processing device, cause the processing device to:
provide an output authorizing the second user to perform the service request on behalf of the first user in the first role.

9. A method comprising:
receiving, by a processing device, a service request comprising a request header specifying a first role and a second role from a set of roles, wherein each role of the set of roles is associated with one or more capabilities;
determining, by the processing device, that a first set of capabilities from the one or more capabilities allocated to the first role matches a set of required privileges necessary to perform the service request,
assigning, by the processing device, the first role to a first user and the second role to a second user, wherein the second user is acting on behalf of the first user,
determining, by the processing device, that a second set of capabilities from the one or more capabilities is allocated to the first user, wherein the first user is specified in the request header as acting in the first role by matching a set of required privileges necessary to perform the service request, and
determining, by the processing device, that a third set of capabilities from the one or more capabilities is assigned to the second role and associated with the second user by matching the set of required privileges necessary for the second user to perform the service request on behalf of the first user in the first role.

10. The method of claim 9, wherein the processing device is a resource-based web service processing device comprising a set of content and report functionality.

11. The method of claim 9, wherein the processing device is within a policy decision point machine.

12. The method of claim 9, wherein the second role is defined according to one or more capabilities associated with a customer care representative.

13. The method of claim 9, wherein the second user cannot authenticate as the first user.

14. The method of claim 9, wherein the set of roles comprises a user role, a regulated data role, an administrator role, and a customer care role.

15. The method of claim 9, wherein the request header comprises information that identifies at least one of the first user and the second user.

16. The method of claim 9, further comprising:
providing, by the processing device, an output authorizing the second user to perform the service request on behalf of the first user in the first role.

17. A method comprising:
receiving, by a processing device, a service request comprising a first request header identifying:
a first user and a first role, wherein a first set of capabilities associated with the first user are a subset of a second set of capabilities associated with the first role, and
a second user and a second role, wherein the second role corresponds to a selected capacity in which the second user is acting;
sending, by the processing device to an external device, an authorization request comprising a second request header identifying:
the first user and the first role, and
the second user and the second role;
receiving, by the processing device, an authorization or a denial to perform one or more aspects of the service request wherein the service request may only be granted for a specific set of defined capabilities for both the first user and the first role; and
receiving, by the processing device, an authorization or a denial to perform one or more aspects of the service request wherein the service request may only be granted for a specific set of defined capabilities for a combination of the first user and the second user and the first role, and the second role,
wherein the second user is acting on behalf of the first user in the first role.

18. The method of claim 17, further comprising receiving, by the processing device, a selection of the first role from the first user, wherein the first role is selected from a set of possible roles assigned to the first user.

19. The method of claim 17, further comprising receiving, by the processing device, a selection of the first role from the policy decision point, wherein the first role is selected from a set of possible roles assigned to the user according to a least privilege principle.

20. The method of claim 17, further comprising receiving, by the processing device, the denial to perform the one or more aspects of the service request when the service request requires a role that is different from the first role.

* * * * *

UNITED STATES PATENT AND TRADEMARK OFFICE
CERTIFICATE OF CORRECTION

PATENT NO.          : 9,558,361 B2                                      Page 1 of 1
APPLICATION NO.     : 15/176425
DATED               : January 31, 2017
INVENTOR(S)         : Steiner et al.

It is certified that error appears in the above-identified patent and that said Letters Patent is hereby corrected as shown below:

In the Claims

Column 17, Claim 1, Line 12:
Change "non transitory-processor-readable storage medium" to
-- non-transitory, processor-readable storage medium --

Column 18, Claim 17, Line 63:
Change "the first role, and the second role," to
-- the first role and the second role, --

Signed and Sealed this
Fourth Day of April, 2017

Michelle K. Lee
*Director of the United States Patent and Trademark Office*